(12) United States Patent
Plumettaz et al.

(10) Patent No.: US 9,287,689 B2
(45) Date of Patent: Mar. 15, 2016

(54) METHOD FOR LAYING A PLURALITY OF SUCCESSIVE SECTIONS OF CABLES IN ORDER TO FORM A CABLED CONNECTION OF GREAT LENGTH

(75) Inventors: Gérard Plumettaz, Territet-Veytaux (CH); Michel Dunand, Jonquiere Saint Vincent (FR); Joël Perelle, Montpellier (FR); Olivier Perignon, Les Côtes d-Arey (FR); Michel Cherix, Collombey (CH)

(73) Assignees: PLUMETTAZ HOLDING SA, Bex (CH); EHTP ENTERPRISE HYDRAULIQUE ET TRAVAUX PUBLICS, Saint-Etienne-du-Gres (FR)

( * ) Notice: Subject to any disclaimer, the term of this patent is extended or adjusted under 35 U.S.C. 154(b) by 483 days.

(21) Appl. No.: 13/817,737

(22) PCT Filed: Aug. 19, 2011

(86) PCT No.: PCT/EP2011/064272
§ 371 (c)(1),
(2), (4) Date: Jul. 8, 2013

(87) PCT Pub. No.: WO2012/022799
PCT Pub. Date: Feb. 23, 2012

(65) Prior Publication Data
US 2013/0277629 A1    Oct. 24, 2013

(30) Foreign Application Priority Data

Aug. 20, 2010    (CH) ........................................ 1338/10

(51) Int. Cl.
*H02G 1/08* (2006.01)
(52) U.S. Cl.
CPC ..................................... *H02G 1/086* (2013.01)

(58) Field of Classification Search
None
See application file for complete search history.

(56) References Cited

U.S. PATENT DOCUMENTS

| 1,946,037 A | 2/1934 | Scott |
| 2,930,584 A | 3/1960 | Hensley et al. |

(Continued)

FOREIGN PATENT DOCUMENTS

| DE | 3220286 A1 | 12/1983 |
| DE | 4038156 A1 | 6/1992 |

(Continued)

OTHER PUBLICATIONS

Application and File History of U.S. Appl. No. 13/885,626, Inventor Willem Griffioen, filed Jul. 31, 2013.

(Continued)

*Primary Examiner* — Joseph J Hail
*Assistant Examiner* — Brian Keller
(74) *Attorney, Agent, or Firm* — Patterson Thuente Pedersen, P.A.

(57) ABSTRACT

A method for laying a plurality of cable sections to be successively positioned in series in a buried duct, according to a flowing-pushing method using a pressurized fluid. The different cable sections are successively introduced into the duct in a single entry point comprising a laying device notably comprising an orifice for introducing a pressurized fluid, a cable section entirely introduced into the duct is pushed towards the position which it should occupy in the duct, only by the pressure of the fluid introduced by said laying device and when a cable section has reached his final position in the duct, an opening is made in the duct near to the rear of the cable section.

11 Claims, 3 Drawing Sheets

(56) References Cited

U.S. PATENT DOCUMENTS

| | | |
|---|---|---|
| 3,102,715 A | 9/1963 | Weitzel et al. |
| 3,321,184 A * | 5/1967 | Goss ................... 254/134.4 |
| 4,569,420 A | 2/1986 | Pickett et al. |
| 4,756,510 A * | 7/1988 | Klamm et al. ......... 254/134.4 |
| 4,895,221 A | 1/1990 | Carlson |
| 5,052,660 A | 10/1991 | Bergman |
| 5,458,317 A | 10/1995 | Caracofe et al. |
| 5,810,867 A | 9/1998 | Zarbatany et al. |
| 5,897,103 A | 4/1999 | Griffioen et al. |
| 5,915,770 A | 6/1999 | Bergstrom |
| 6,030,405 A | 2/2000 | Zarbatany et al. |
| 6,793,202 B2 | 9/2004 | Pecot et al. |
| 2004/0180194 A1 | 9/2004 | White |
| 2005/0184279 A1 | 8/2005 | Diggle, III et al. |
| 2005/0259930 A1 | 11/2005 | Elkins, II et al. |
| 2006/0219992 A1 * | 10/2006 | Fee et al. ................... 254/134.4 |
| 2008/0131592 A1 | 6/2008 | Kummer et al. |
| 2008/0188793 A1 | 8/2008 | Kozak et al. |
| 2008/0289181 A1 | 11/2008 | Kozak et al. |
| 2013/0299758 A1 | 11/2013 | Griffioen |

FOREIGN PATENT DOCUMENTS

| | | |
|---|---|---|
| DE | 4107321 A1 | 9/1992 |
| DE | 59 006 513 D1 | 8/1994 |
| EP | 0 437 709 A1 | 7/1991 |
| EP | 0 437 709 B1 | 7/1994 |
| EP | 1 518 317 A1 | 3/2005 |
| EP | 2 194 625 A2 | 6/2010 |
| FR | 2 655 782 A1 | 6/1991 |
| FR | 2 717 959 A1 | 9/1995 |
| JP | 03276104 | 4/1997 |
| JP | 2001028817 | 1/2001 |
| JP | 2001186618 | 7/2001 |
| JP | 2002082268 | 3/2002 |
| JP | 2008537181 A1 | 9/2008 |
| WO | WO 2004/006421 A1 | 1/2004 |
| WO | WO 2004/008599 A1 | 1/2004 |
| WO | WO2006115541 A1 | 11/2006 |
| WO | WO 2007/123335 A1 | 11/2007 |
| WO | WO 2008/097547 A2 | 8/2008 |

OTHER PUBLICATIONS

Written Opinion and International Search Report for International Application No. PCT/EP2011/005771 dated Apr. 24, 2012.

* cited by examiner

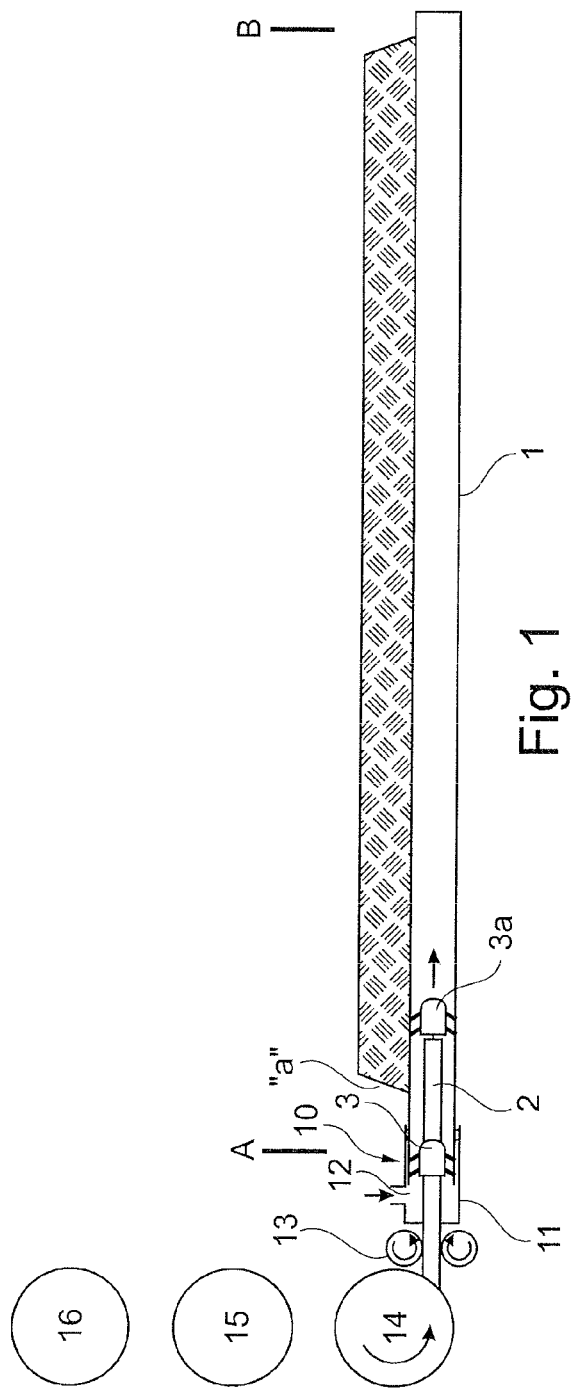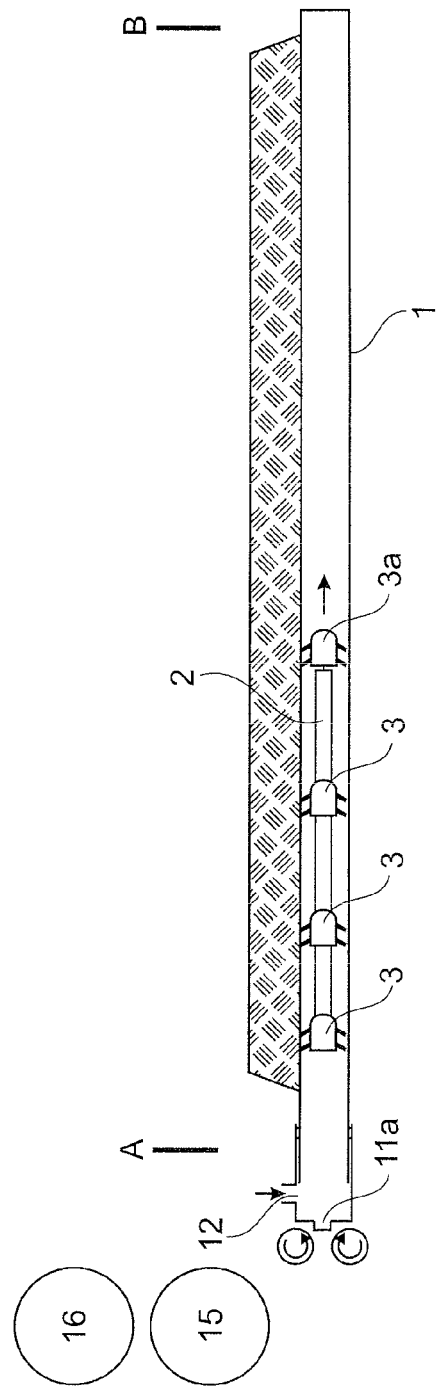

METHOD FOR LAYING A PLURALITY OF SUCCESSIVE SECTIONS OF CABLES IN ORDER TO FORM A CABLED CONNECTION OF GREAT LENGTH

PRIORITY CLAIM

This application is a National Phase entry of PCT Application No. PCT/EP2011/064272, filed Aug. 19, 2011, which claims priority from CH Application No. 01338/10 filed Aug. 20, 2010, the disclosures of which are hereby incorporated by referenced herein in their entirety.

FIELD OF THE INVENTION

The present invention relates to a method for laying a cable connection of great length by successively laying a plurality of sections of cables of customary length.

BACKGROUND

A cable connection of great length, whether this is a connection of electric power cables, telecommunications cables or optical cables, generally consists of a succession of sections of cables, the length of each section generally corresponding to the length which may be transported on a drum. After laying, these successive sections are connected together through suitable junctions.

The laying of a cable connection of great length according to the prior art, after the ducts which should receive the sections of cables have been buried, consists of making a cavity or laying excavation at each duct end in order to be able to bring a full drum there and to introduce and lay the corresponding cable section, in particular according to any of the techniques described in patent EP 1 518 317 or application PCT/EP2010/060 371, both of which are herein incorporated by reference.

The major drawback of such a laying technique lies in the fact that a cavity or laying excavation has to be made between each laid duct, which entails significant civil engineering costs. Further, it may be difficult to access the laying cavity with a drum of great dimensions, for example if the junction between two successive ducts is located on a mountain or in a tunnel or else in a built-up environment.

In order to avoid these drawbacks, embodiments of the invention proposes methods for laying a cable connection of great length in the claims.

BRIEF DESCRIPTION OF THE DRAWINGS

The invention is described in detail hereafter, with reference to the drawing schematically illustrating certain steps of the method according to embodiments of the invention and including figures wherein:

FIG. 1 illustrates an example method for laying a plurality of cable sections in accordance with the invention, wherein a first cable section is being unwound from a drum and laid within a duct;

FIG. 2 illustrates the example method for laying a plurality of cable sections in accordance with the invention, wherein the whole first cable section has been unwound from its drum;

DETAILED DESCRIPTION

Figure 3:
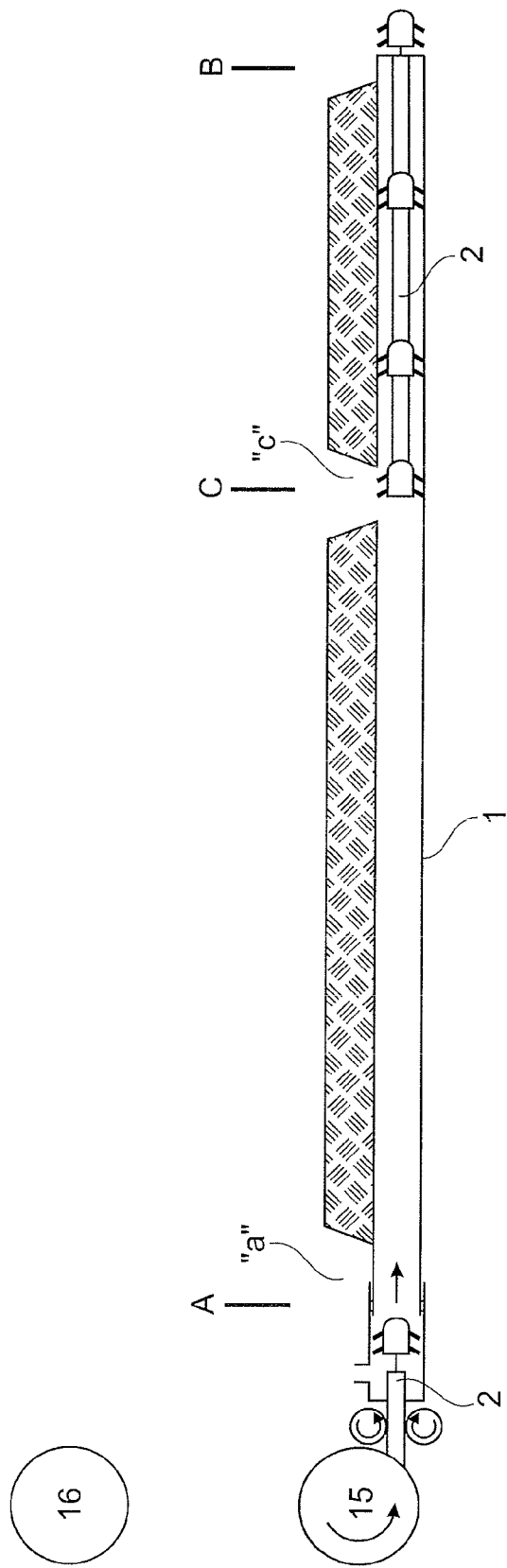
FIG. 3 illustrates the example method for laying a plurality of cable sections in accordance with the invention, wherein the front portion of the first cable section has reached the end of the duct.

FIG. 1 shows a buried duct 1 between points A and B, the distance between points A and B being generally greater than the length of the cable which may be wound on a transport drum.

At one of the ends of the duct 1, here the end A, a laying device 10 is positioned for laying by a floating-pushing method as described in application PCT/EP2010/060 371, which is herein incorporated by reference. This device comprises a pressure housing 11 comprising a pressurized fluid inlet 12 (for example water), mechanical pushing means 13, and means (not shown here) for introducing and attaching pigs 3 on a cable section 2. The cable section 2 is being unwound from the drum 14 and is pushed towards the interior of the duct 1 by the pressure exerted by the pressurized fluid introduced through the orifice 12. As described in the aforementioned application, each of the pigs 3 comprises means with which a pressure drop may be obtained between the rear and the front of the pig 3, the pressure drop between the one introduced by the orifice 12 and the one prevailing at the front of the cable section being absorbed by the pigs 3 positioned along the cable section 2 as well as by the one of the front end 3a. The duct 1 was sealed throughout its length between points A and B, the B end being opened putting this duct portion 1 under atmospheric pressure.

According to a specific embodiment of the process, the total drop of pressure between the rear end and the front end of the cable section is equally divided by the pigs disposed along the cable section.

At the end A, a relatively large laying cavity "a" was made for positioning the laying device 10 therein. It is noted that two other drums 15, 16 each containing a cable section 2 were brought into proximity to the laying cavity "a".

In FIG. 2, the example method for laying a plurality of cable sections in accordance with the invention is seen after the whole first cable section 2 has been unwound from the drum 14. The latter was moved away from the building site. It is seen that three pigs 3 in addition to those of the front end 3a have been attached to the cable section 2, that the orifice through which the cable section 2 was introduced into the pressure housing 11 was blocked by a sealing means 11a, the cable section 2 being only propelled by the pressurized fluid inside the duct 1 towards the end B. Pushing the cable section 2 is then only carried out by the fluid.

FIG. 3 illustrates the example method for laying a plurality of cable sections in accordance with the invention, wherein the front portion of the first cable section 2 has reached the end B of the duct 1. At the location where the rear of the first cable section 2 is found, an excavation "c" is made which will subsequently allow the joining to be achieved between the first and second cable sections 2, but which for the moment is used for lowering the fluid pressure towards the front of the second cable section 2 in order to allow its displacement towards the point C. This excavation "c" comprises an opening of the duct 1 in order to access the ends of the cable sections 2 at the point C and to lower the fluid pressure in this location. It is seen in the figure that the second cable section 2 is being introduced into the laying device 10 from the second drum 15.

The excavation "c" made at the point C is less significant than the one in A made for introducing sections of cables 2. In particular, it is by means of these intermediate excavations of less significance that the method according to the invention is clearly more advantageous than the methods according to the prior art.

Figure 4:
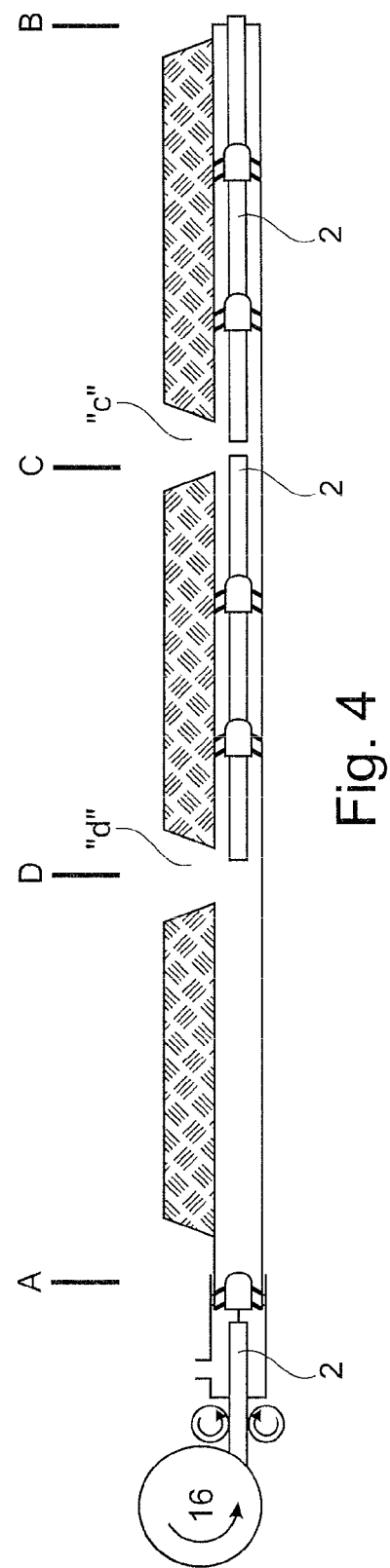
FIG. 4 illustrates the example method for laying a plurality of cable sections in accordance with the invention, wherein a second cable section has been laid and a third section is beginning to be laid.

FIG. 4 depicts the example method for laying a plurality of cable sections in accordance with the invention, wherein the second cable section 2 placed between the points C and D. It is seen that the pigs 3 on the rear end of the first cable section 2 as well as the pig 3a on the front end of the second cable section 2 have been disassembled in order to allow subsequent joining of these cable sections 2. In point D, an excavation "d" similar to the excavation "c" allows lowering of the fluid pressure at the front of the third cable section 2 which is seen being introduced into the end A of the duct 1 from the third drum 16.

Figure 5:
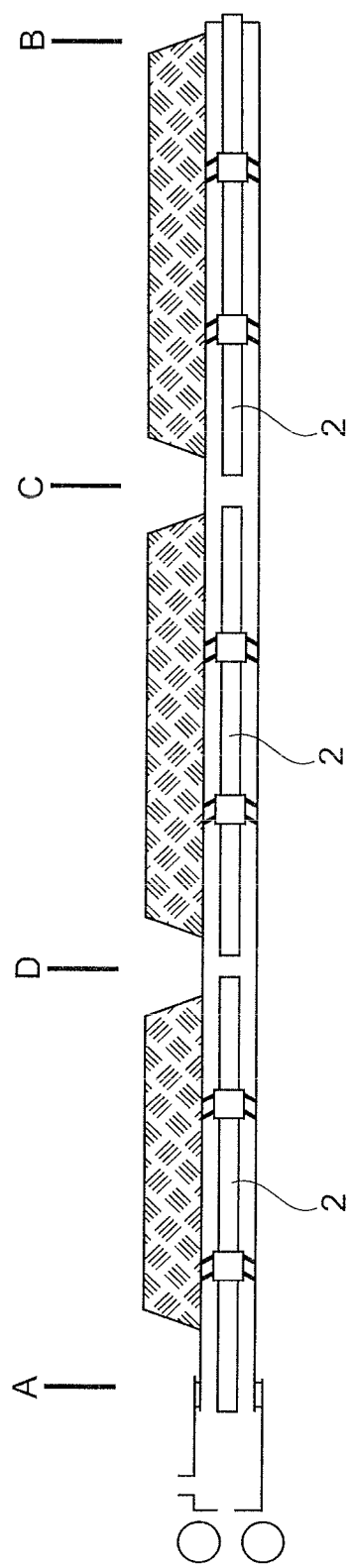
FIG. 5 illustrates the example method for laying a plurality of cable sections in accordance with the invention, wherein the first, second, and third sections have been laid.

FIG. 5 depicts the example method for laying a plurality of cable sections in accordance with the invention, wherein all the cable sections 2 have been laid as described earlier, the pigs 3 and 3a mounted on the ends of the cable sections have been disassembled, while those which had been assembled along said sections remain in place considering that they are inaccessible.

Figure 6:
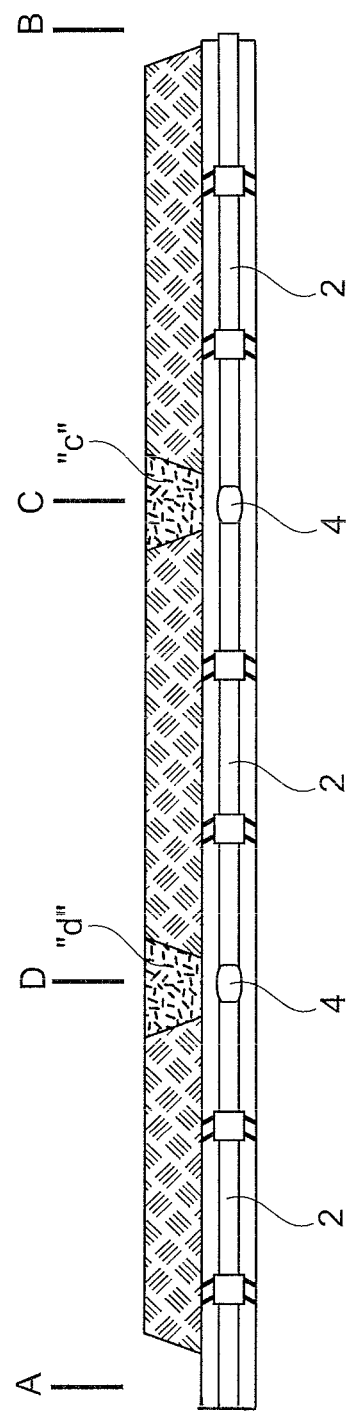
FIG. 6 illustrates the example method for laying a plurality of cable sections in accordance with the invention, wherein the first, second, and third sections have been connected.

In FIG. 6, the finished cable connection between points A and B is seen, suitable junctions 4 having been made for connecting together successive sections of cables 2. The excavations "c" and "d" have been refilled, and the laying device 10 has been disassembled. The electric or optical end equipment in A and B has not been illustrated in the figure.

In the exemplary method described above, three sections of cables 2 have been laid; it is obvious that it is possible to have another number of successive cable sections for obtaining the cable connection. Also, each illustrated cable section included a front end pig 3a and three pigs 3 placed along the section, including a pig 3 at the rear end. Depending on the length of the section, it's mass, the rectilinear or curved plot of the path of the duct 1, it is possible to have a different number and arrangement of the pigs. The arrangement and the number of pigs can also be different from one cable section to the next. For a relatively lightweight cable section 2, such as for example an optical cable section, and over not very meandering path, it is possible to only attach one single pig to said section, preferably the front end pig 3a.

With the example method according to the invention described above, it is therefore possible to obtain cable connections of great length at a reasonable cost while avoiding the need for digging a large excavation for introducing cables at each intermediate point, as well as assembling and disassembling several times the laying device.

The invention claimed is:

1. A method for laying a plurality of cable sections each having a cable front end and a cable rear end, the cable sections adapted to be successively positioned in series in end to end relationship in a buried duct, according to a flowing-pushing method using a pressurized fluid, comprising the steps of:

successively introducing the plurality of cable sections, leading with the cable front end, into the duct through a laying device, the laying device comprising a pressure housing including structure defining a pressure housing cable entry port, the laying device further including structure defining an orifice adapted for introducing a pressurized fluid into the pressure housing, and the pressure housing being operably coupled to said duct in fluid communication relationship therewith;

after a respective cable section is entirely introduced into the duct, pushing that respective cable section through the duct to arrive at a respective cable section final position which it should occupy in the duct, only by the pressure of the pressurized fluid introduced through said laying device and positioning each respective cable section in its respective cable section final position before introducing any successive cable section; and when a cable section has reached a final position in the duct, making an opening in the duct near to the rear end of said cable section.

2. The method according to claim 1, wherein the fluid is a liquid.

3. The method according to claim 2, wherein the liquid is water.

4. The method according to claim 1, wherein the fluid is a gas.

5. The method according to claim 4 wherein the gas is air.

6. The method according to claim 1, wherein each cable section during its introduction into the duct is provided with at least one pig, the at least one pig presenting a rear face and a front face.

7. The method according to claim 6, wherein at least one cable section is provided with a front end pig.

8. The method according to claim 6, wherein, in addition to said at least one front end pig, said at least one cable section is provided with a rear end pig.

9. The method according to claim 6, wherein at least one cable section is provided with at least one pig located at the front end of said cable section, with one pig located at the rear end of said cable section, and with one intermediate pig, the intermediate pig being placed on said cable section between the pig located at the front end of said cable section and the pig located at the rear end of said cable section.

10. The method according to claim 6, wherein each cable section during its introduction into the duct is provided with a plurality of pigs and wherein a drop of pressure between the rear end and the front end of the cable section is divided over the pigs disposed along said cable section.

11. The method according to claim 10, wherein each cable section during its introduction into the duct is provided with a plurality of pigs, and wherein the drops of pressure caused by each pig are equal.

* * * * *